United States Patent [19]

Kitamura

[11] Patent Number: 5,263,095
[45] Date of Patent: Nov. 16, 1993

[54] METHOD OF AND APPARATUS FOR PROCESSING LINEWORK IMAGE

[75] Inventor: Hideaki Kitamura, Kyoto, Japan

[73] Assignee: Dainippon Screen Mfg. Co., Ltd., Japan

[21] Appl. No.: 765,908

[22] Filed: Sep. 23, 1991

[30] Foreign Application Priority Data

Sep. 26, 1990 [JP] Japan .................................. 2-258360
Jan. 11, 1991 [JP] Japan .................................. 3-013932

[51] Int. Cl.⁵ .............................................. G06K 9/34
[52] U.S. Cl. .......................................... 382/9; 382/8; 382/24; 382/57; 345/22
[58] Field of Search .................... 382/8, 9, 24, 61, 57; 340/723, 728, 739; 358/75, 80

[56] References Cited

U.S. PATENT DOCUMENTS

| | | | |
|---|---|---|---|
| 4,550,434 | 10/1985 | Shimada et al. | 382/61 |
| 4,741,044 | 4/1988 | Polomsky et al. | 382/8 |
| 4,758,782 | 7/1988 | Kobayashi | 382/8 |
| 4,881,269 | 11/1989 | Billiotte et al. | 382/8 |
| 5,012,521 | 4/1991 | Endo et al. | 382/57 |
| 5,144,679 | 9/1992 | Kakumoto et al. | 382/61 |

FOREIGN PATENT DOCUMENTS

2643996 of 1990 France .
233778 of 1985 Japan .
174880 of 1986 Japan .

*Primary Examiner*—Joseph Mancuso
*Attorney, Agent, or Firm*—Ostrolenk, Faber, Gerb & Soffen

[57] ABSTRACT

A block copy image is divided into several regions R1 and R6, to which different system colors are allocated. A subject region PR including a line break CP1 is specified by an operator. Run-length data of a run-length less than or equal to a predetermined threshold value is automatically detected out of various run-length data representing the subject region PR. White/black designation data defining the color of an image in the run-length data is changed into the color of a linework. The break CP1 in the linework is thus reconnected without operator's instruction. Alternatively, the subject region PR is divided into two portions. The two portions are further divided into separate areas to which different system colors are allocated. This enables an operator to easily detect the position of a line break because the linework elements separated by a break have different colors. The break is then reconnected according to operator's instruction.

32 Claims, 15 Drawing Sheets

SCT

| Ns | Nd |
|----|----|
| 21 | 0  |
| 22 | 1  |
| 23 | 0  |
| 24 | 1  |
| 25 | 0  |
| 26 | 1  |

IST

| Ns(2) = Ns(4) |
| Ns(5) = Ns(6) |

BY SKIPPING PROCESS

BY SPECIAL REDUCTION PROCESS

METHOD OF AND APPARATUS FOR PROCESSING LINEWORK IMAGE

BACKGROUND OF THE INVENTION

1. Field of the Invention

The present invention relates to a method and apparatus for processing a linework image, and more particularly to a method and apparatus for finding and reconnecting a break in a linework image.

2. Description of the Related Art

A block copy is prepared as an original of characters and lineworks in a prepress process for a color printing plate. The block copy is formed by arranging phototype-setting characters and drafted keylines on a layout sheet in the same dimensions and quality as the final products. Instructions for the subsequent processes are also given on the layout sheet; that is, the layout sheet acts as an instruction paper for the prepress process.

Tint laying is generally performed in the prepress process. Tint laying is processing in which a specified region within an image is uniformly filled with a desired color. Automatic tint laying is employed in some of the modern image processing systems. In such systems, tint laying is completed, for example, by obtaining binary image data of a block copy image with an image scanner and filling a certain closed region in the block copy image with a desired color with an image processor.

A linework, which is supposed to define a closed region in a block copy image, is sometimes found incomplete or broken when filling of the closed region is executed. The incomplete or broken linework is generally attributable to an incomplete draft or layout sheet, or unsuccessful image reading with an image scanner.

Line breaks are generally reconnected manually; an operator directly detects line breaks in a block copy image displayed on a CRT and fills them to correct the block copy image.

A line break has generally a width of one to several pixels. Accordingly, only experienced operators can efficiently detect breaks on the CRT. When there are several breaks in a linework, it takes rather a long time to detect and reconnect all of them.

JAPANESE PATENT LAYING-OPEN GAZETTE No. Sho-61-139892 proposes a method of reconnecting line breaks which utilizes a technique of changing binary image data into vector data. Vector data processors for executing this method are rather complicated and expensive.

On the other hand, those image processors for processing lineworks (hereinafter referred to as linework processors), which change the level of binary image data for each pixel, are relatively simple. Accordingly, addition of a specific function of vector data processing to linework processors drastically increases the price of the processors.

Furthermore, the method including vector data processing does not perfectly detect line breaks and requires operators confirmation for the existence thereof. It means that the total time for processing is not shortened greatly.

SUMMARY OF THE INVENTION

An object of the invention is to provide a method of and an apparatus for readily detecting and reconnecting line breaks without vector data processing.

The present invention is directed to a method of processing a linework image with the aid of an image processing system, comprising the steps of:

(a) preparing image data representing the linework image;

(b) examining the image data to find an image part which has a color different from that of a linework element and a width less than a predetermined threshold value; and (c) defining the image part as a break.

Preferably, the step (b) comprising the steps of:

(b-1) examining part of the image data for each scanning line on the linework image; and (b-2) finding the width along the scanning line.

The method of processing a linework image further comprises the step of: (d) changing the color of the image part to the color of the linework element to thereby reconnect the break.

Furthermore, the method comprises the step of:

(e) displaying the linework image on a display means, and specifying a subject region to be processed in the linework image displayed on the display means prior to the step (b); and wherein the step (b) comprises examining the image data within the subject region.

The step (e) further comprises the steps of:

(e-1) dividing the linework image into plural separate regions, and allocating different colors to the separate regions;

(e-2) displaying the linework image filled with the respective different colors on a display means;

(e-3) comparing a first color at the inside of a linework element supposed to constitute a closed loop with a second color at the outside thereof on the linework image displayed on the display means; and (e-4) specifying the subject region so that the subject region includes a linework element whose first and second colors are identical.

In the embodiment, the image data is run-length data.

According to an aspect of the present invention, a method of processing a linework image with the aid of an image processing system comprises the steps of:

(a) preparing image data representing the linework image;

(b) dividing the linework image into plural divisional image areas by at least one boundary;

(c) further dividing each of the plural divisional image areas into separate regions, and allocating different colors to the separate regions;

(d) displaying the linework image filled with the respective different colors on a display means;

(e) finding a part of a linework element of the linework image, the part having a different color from a neighboring part of the linework element;

(f) displaying the part on the display means; and (g) detecting a break of the linework element within the part displayed on the display means.

Preferably at the step (f), the part is displayed larger than the part in the linework image displayed at the step (c).

The method further comprises the step of:

(h) changing the color of the break to the color of the linework element to thereby reconnect the break.

The method still further comprises the step of:

(i) displaying the linework image on a display means, and specifying a subject region to be processed in the linework image on the display means prior to the step (b); and wherein at the step (b) the subject region is divided into the plural divisional areas.

The step (d) comprises the steps of:

(d-1) dividing the subject region into pixel blocks of a prescribed shape, each pixel block including plural pixels;

(d-2) establishing priority of colors of pixels;

(d-3) extracting a representative pixel from each pixel block according to the priority;

(d-3) generating a reduced image formed of the representative pixel; and (d-4) displaying the reduced image on the display means.

The step (g) further comprises the steps of:

(g-1) dividing the linework image into plural separate regions, and allocating different colors to the separate regions;

(g-2) displaying the linework image filled with the respective different colors on a display means;

(g-3) comparing a first color at the inside of a linework element supposed to constitute a closed loop with a second color at the outside thereof on the linework image displayed on the display means; and (g-4) specifying the subject region so that the subject region includes a linework element whose first and second colors are identical.

The present invention is also directed to an apparatus for processing a linework image, comprising:

first means for obtaining image data representing the linework image;

second means for examining the image data to find an image part which has a color different from that of a linework element and a width less than a predetermined threshold value, thereby defining the image part as a break.

According to an aspect of the present invention, an apparatus for processing a linework image comprises:

means for obtaining image data representing the linework image;

first dividing means for dividing the linework image into plural divisional image areas by at least one boundary;

second dividing means for further dividing each of the plural divisional image areas into separate regions, and allocating different colors to the separate regions;

display means for displaying an image;

first data supply means for supplying image data representing the linework image filled with the respective different colors to the display means, thereby to display the linework image in the respective different colors;

input means for generating signals specifying a part of a linework element of the linework image, the part having a different color from a neighboring part of the linework element;

second data supply means for supplying image data representing the part to the display means, thereby to display the part; and pointing means for pointing a break of the linework element within the part displayed on the display means.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 16 through 19 are explanatory views showing the process of the region segmentation;

FIG. 20 illustrates an identical system color table;

DESCRIPTION OF THE PREFERRED EMBODIMENT

A. Structure of Apparatus

Figure 1:
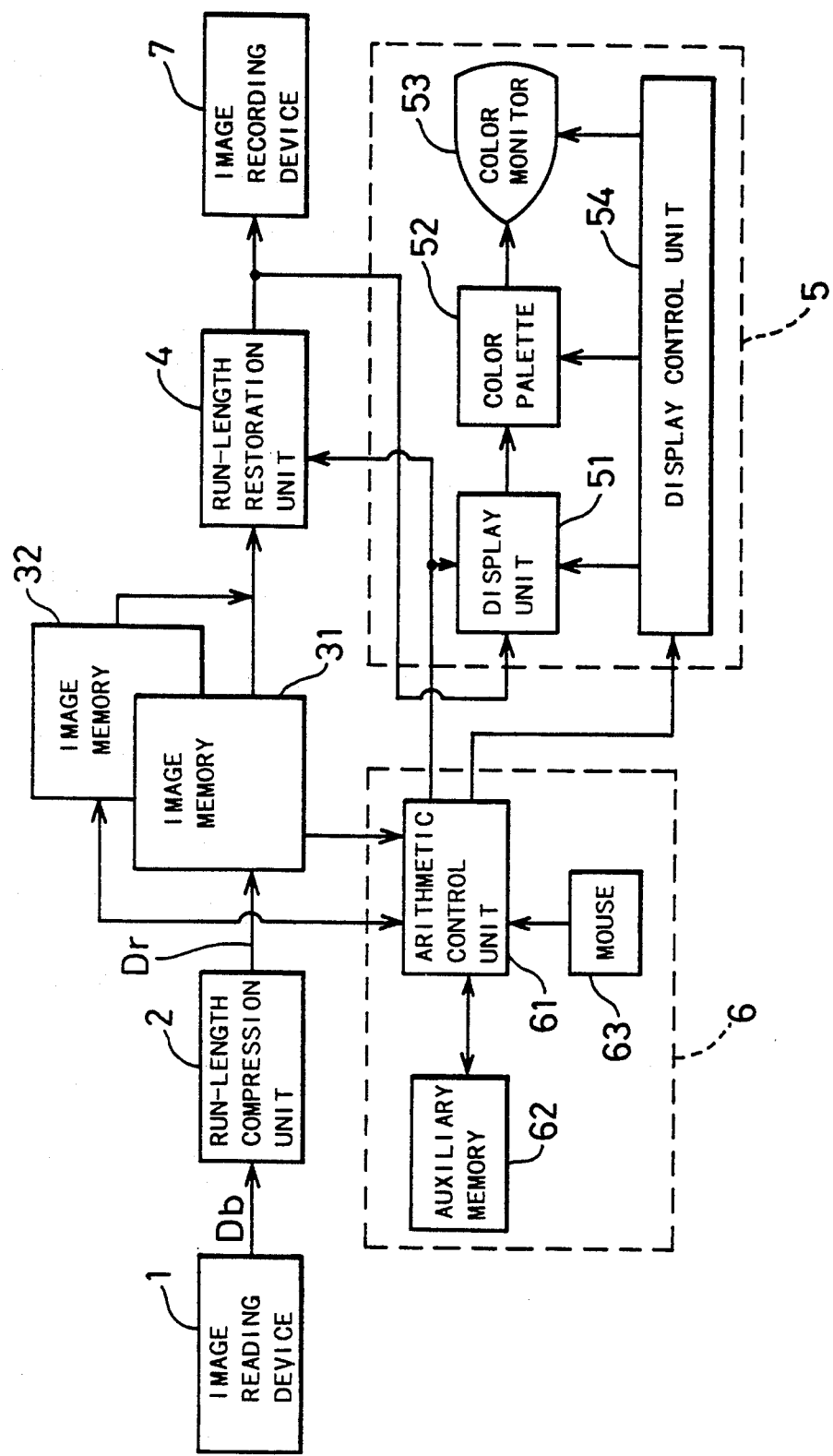
FIG. 1 is a block diagram illustrating the structure of an image processor embodying the present invention.

FIG. 1 is a block diagram schematically illustrating the structure of an image processing apparatus embodying the present invention for reconnecting line breaks of a linework image. The image processing apparatus includes the following elements:

(a) Image reading device 1: reading a block copy image to obtain binary image data. The image reader 1 is a flat-bed type scanner, for example.

(b) Run-length compression unit 2: compressing the binary image data obtained by the image reading device 1 to produce run-length data.

(c) Image memories 31 and 32: storing run-length data supplied from the run-length compression unit 2 and a CPU 6 (described later). The first image memory 31 stores the run-length data of an original block copy image and a final block copy image whose line breaks have reconnected. The second image memory 32 is used as a temporary memory in detecting and reconnecting line breaks and stores data of an image region specified by an operator as described below.

(d) Run-length restoration unit 4: restoring run-length data supplied from the image memories 31 and 32 to produce bit map data.

(e) Color monitor device 5: displaying a color image as a function of the bit map data supplied from the run-length restoring part 4 and the CPU 6. The monitor device 5 includes:

(e-1) a display memory 51 for storing bit map data of an image to be displayed;

(e-2) a color palette 52 for converting color numbers (specified for each image region of a block copy image) included in image data given by the display memory 51 into brightness signals of R for red, G for green, and B for blue;

(e-3) a color monitor 53 for displaying a color image; and (e-4) a display control unit 54 for controlling the display of an image on the color monitor 53, renewing color data (information showing color numbers and corresponding brightness signals of three primary colors) stored in the color palette 52, and adjusting the position of a display cursor on the color monitor 53 corresponding to the movement of a mouse.

(f) CPU 6: controlling the whole image processor and executing required operations. The CPU 6 includes:

(f-1) an arithmetic and control unit 61 for controlling each part of the image processor and executing various operations including extraction, division, and segmentation of image regions, and image data skipping;

(f-2) an auxiliary memory 62 for storing temporary data required for each process; and (f-3) a mouse 63 usable for specifying a subject region to be processed in an image displayed on the color monitor 53.

(g) Image recording device 7: recording a reproduced image having reconnected line breaks onto a recording medium such as a photosensitive film.

B. Processing Procedure

Figure 2:
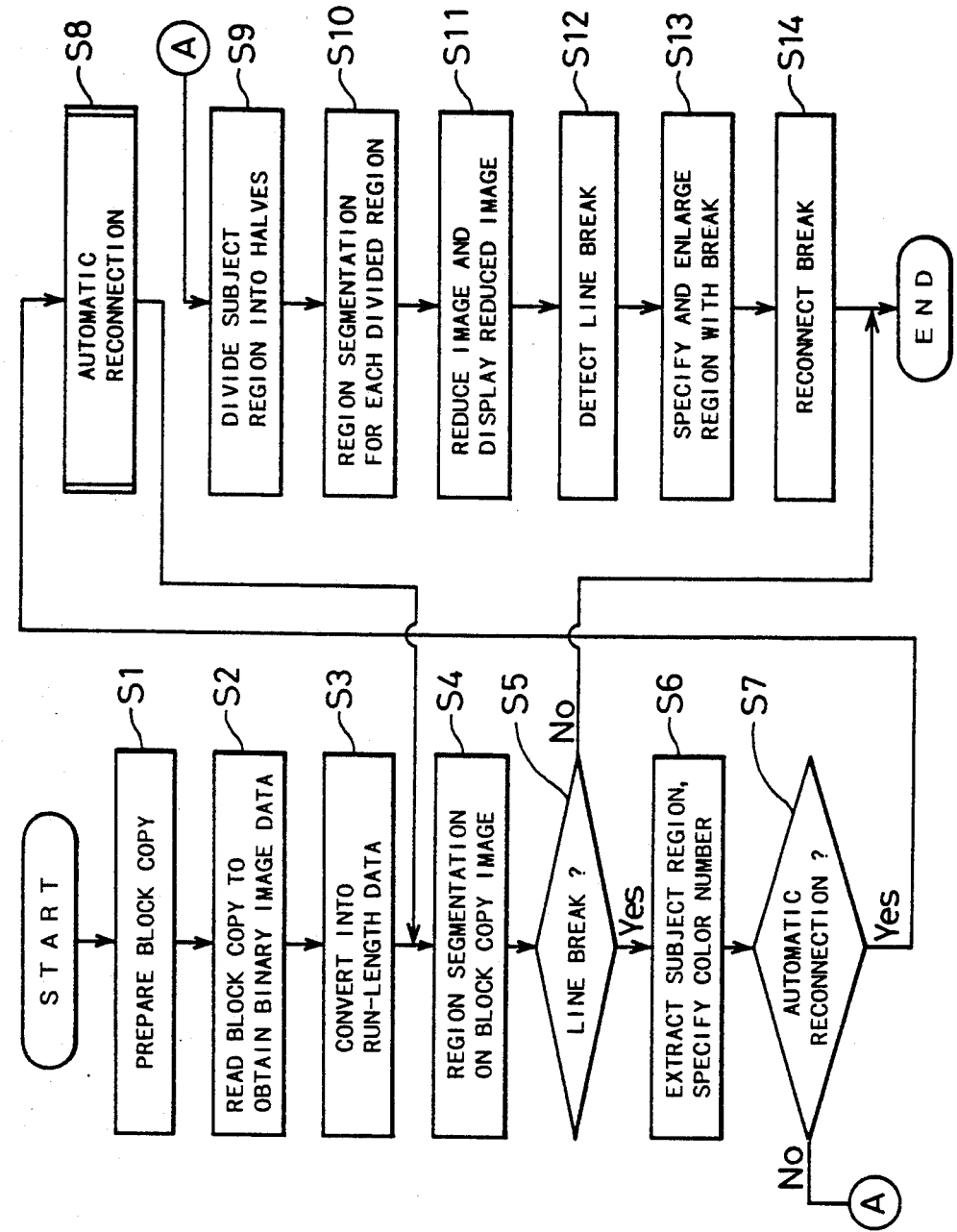
FIG. 2 is a flowchart showing processes for detecting and reconnecting a line break.

FIG. 2 is a flowchart showing the procedure for detecting and reconnecting a line break.

Figure 3:
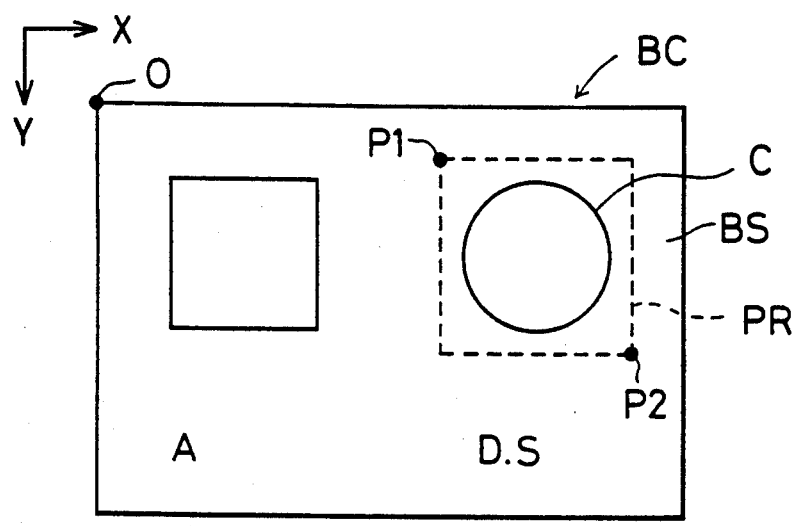
FIG. 3 is a plan view showing an example of a block copy.

At step S1, a block copy having characters and plane figures disposed on a base sheet is prepared. FIG. 3 is a plan view of a block copy BC, which includes plane figures (a square and a circle C) and characters as D.S written in black on a white base sheet BS.

At step S2, binary image data Db of the block copy BC is read by the image reading device 1. The binary image data Db represents the color, black or white, of each pixel in the block copy image.

Figure 4:
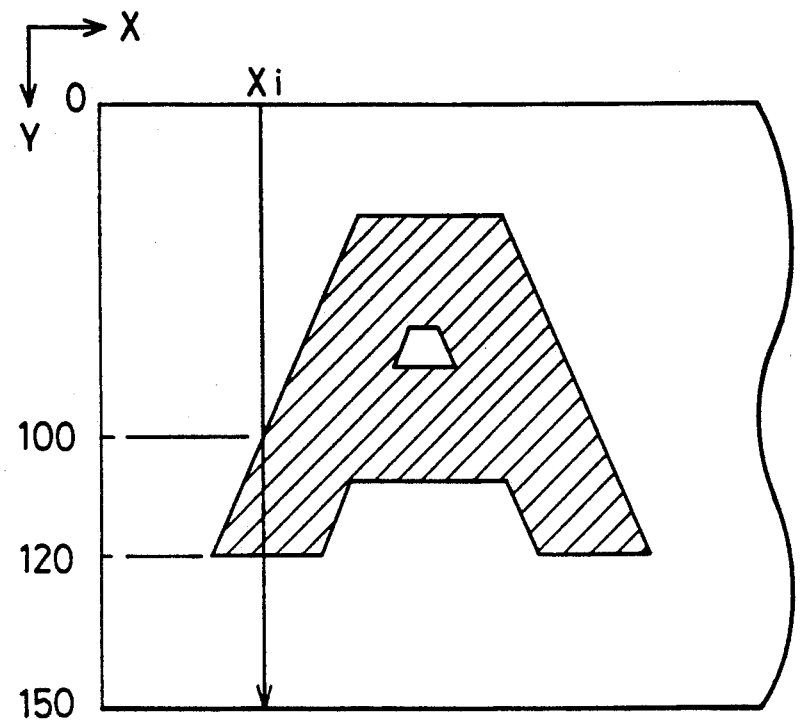
FIG. 4 is a enlarged plan view of part of the block copy.
Figure 5:
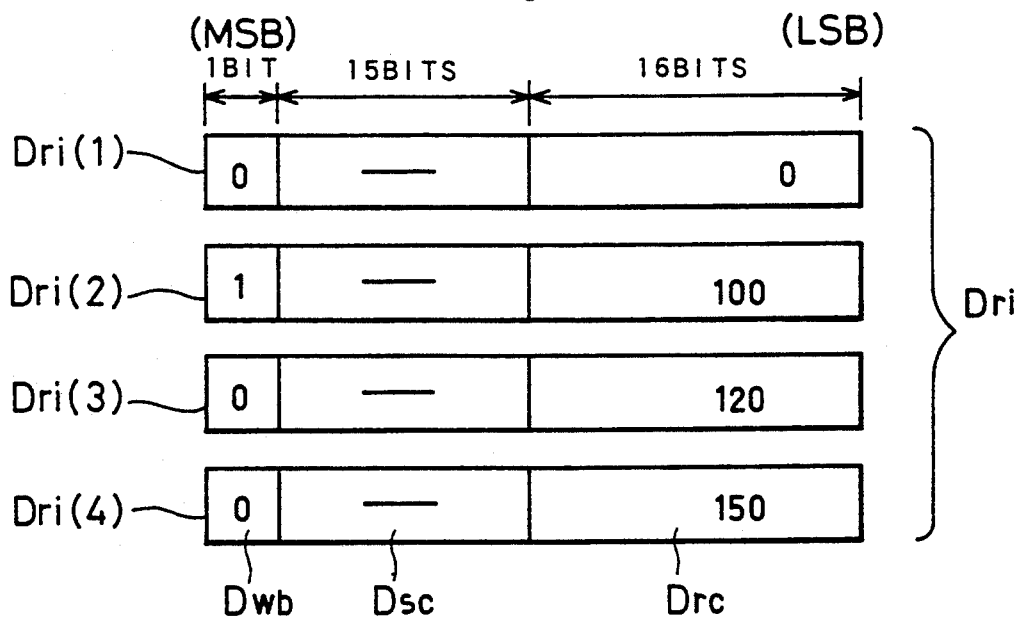
FIG. 5 is an explanatory view illustrating the structure of run-length data corresponding to the part shown in FIG. 4.

The program then proceeds to step S3, at which the binary image data Db supplied from the image reading device 1 to the run-length compression unit 2 is converted into run-length data Dr. FIGS. 4 and 5 are explanatory views illustrating the structure of the run-length data Dr.

An enlarged character A of the block copy image is shown in FIG. 4 with the ordinate of a main scanning direction Y and the abscissa of a subscanning direction X. The ordinate ranges from zero to 150.

FIG. 5 shows the structure of run-length data Dri on the scanning line at the subscanning coordinate Xi. The run-length data Dri includes four consecutive data Dri(1) through Dri(4) (each hereinafter referred to as unit run-length data). Each unit run-length data Dri(1), Dri(2), Dri(3) and Dri(4) consists of thirty two bits; the MSB is a white/black designation data Dwb showing the color, black or white, of the unit run-length data; the next fifteen bits are system color data Dsc showing system color numbers (described later); and the least significant sixteen bits are coordinate data Drc showing the main scanning coordinate of a starting point of the unit run-length data.

As seen in FIG. 4, at the subscanning line Xi, the image is white in a range between 0 and 99 of the main scanning coordinate Y, black between 100 and 119, and again white between 120 and 150. The three unit run-length data Dri(1) through Dri(3) show the main scanning coordinates of each starting point of the above three ranges and the color, black or white, of the ranges. The last unit run-length data Dri(4) has the maximum main scanning coordinate (=150), which indicates the end of the run-length data for this scanning line. The system color data Dsc in the run-length data does not mean anything at this stage since the system colors are not determined yet.

The run-length data Dr thus obtained are supplied from the run-length compression unit 2 to the first image memory 31 and stored therein. A block copy image is displayed on the color monitor 53 in black and white based on the run-length data Dr.

At step S4, region segmentation is executed. The whole block copy image is divided into independent regions each separated by a boundary between a black portion and a white portion, and different system color numbers Ns are allocated to the respective regions.

Figure 6:
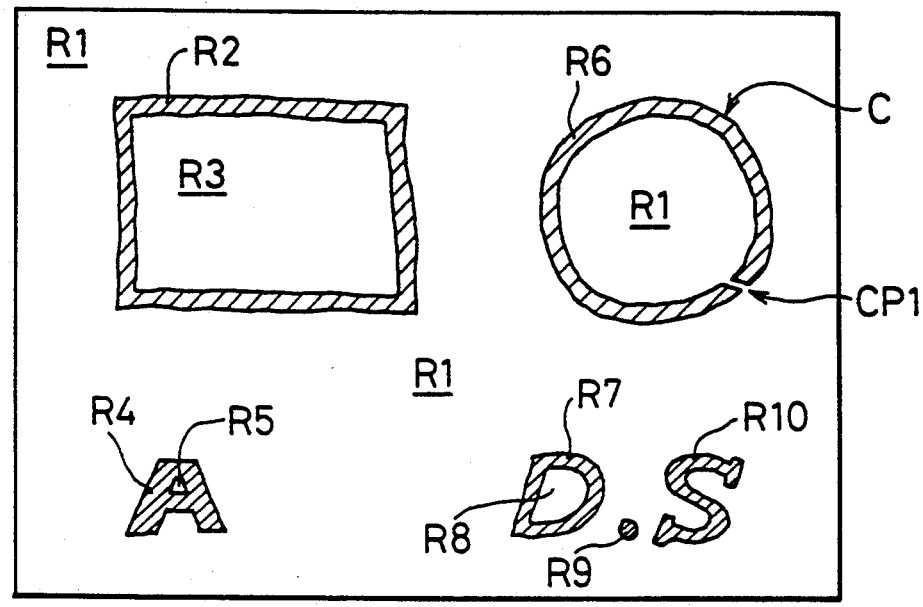
FIGS. 6 and 7 are views showing an image of a block copy image in the embodiment.

FIG. 6 is an explanatory view illustrating independent image regions segmented at step S4. The block copy image is divided into ten image regions (hereinafter referred to as separate regions) R1 through R10. Numbers one through ten are allocated as the system color numbers Ns to the separate regions R1 through R10, respectively. Each system color number Ns is registered as the system color data Dsc in each unit run-length data Dri shown in FIG. 5.

Incidentally, the circle C is assumed to include a break CP1 as shown in FIG. 6.

The number allocated to each separate region is called "system color number Ns" because it is automatically given by the arithmetic and control unit 61 and because it can be used as data indicative of the color of the region. The procedure of the region segmentation will be described later in detail.

The image after the region segmentation is displayed on the color monitor 53. In order to display the whole block copy image, skipped image data is generated by the arithmetic and control unit 61 and stored in the display memory 51. The color palette 52 converts the system color numbers Ns to color data corresponding to the system color numbers Ns, and supplies the color data to the color monitor 53 to display the separate regions R1 through R10 in respective colors.

Figure 7:
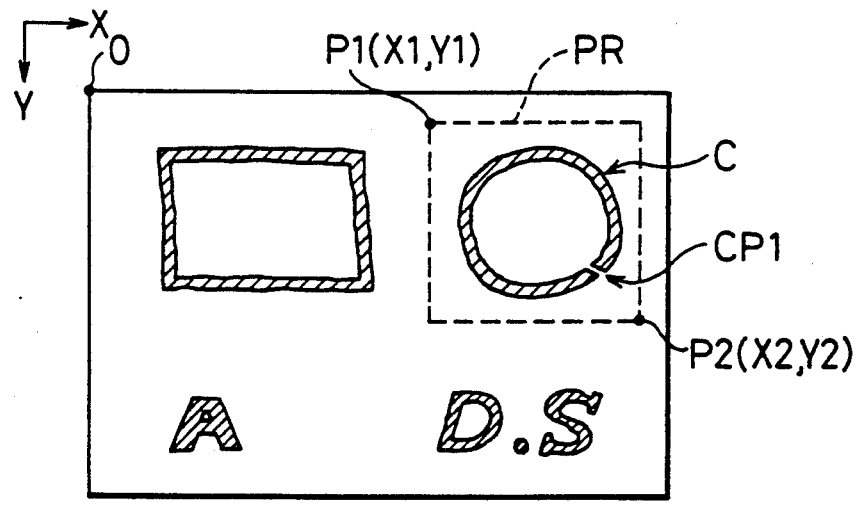

FIG. 7 schematically illustrates an image displayed on the color monitor 53.

In general, breaks are not easily observed with naked eyes on the skipped image because breaks are at most about several tens micrometers across.

On the other hand, the break CP1 is easily found on the image in which the image regions R1 through R10 are filled with the system colors allocated at step S4. If a closed image region (for example, circle C in FIGS. 6 and 7) does not have a break, the outside and inside of the region are painted in different colors. On the contrary, when the circle C has the break CP1 as seen in FIG. 6, the inside and outside of the circle C form a united image region and are painted in an identical color. An operator readily detects a closed image region with a break by finding a closed image region having the same color inside and outside thereof in the color image displayed on the color monitor 53.

When existence of a break of the closed image region (for example, the circle C) is recognized on the color monitor 53 at step S5, the program proceeds to step S6 for detection of the exact position of the break and reconnection thereof.

At step S6, an operator specifies a region subjected to the detection and reconnection of a break (hereinafter referred to as a subject region) PR in the block copy image displayed on the color monitor 53, and stores image data of the subject region PR in the second image memory 32.

Figures 8, 10:
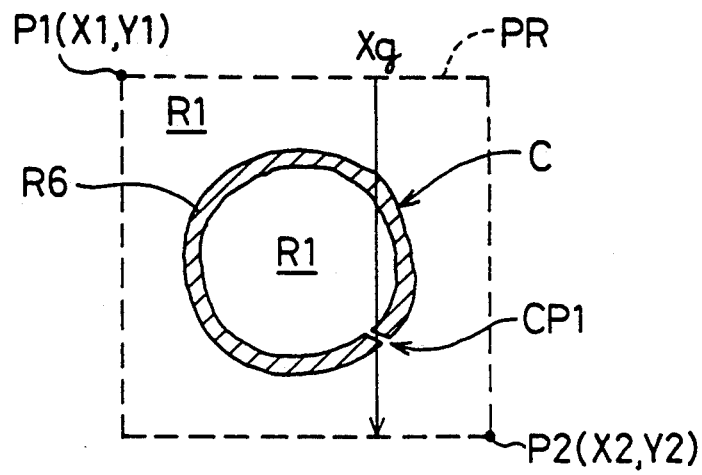
FIG. 8 is an enlarged view of a subject region in the block copy image.
FIG. 10 is a conceptual view illustrating an example of run-length data representing an image having a break.

The subject region PR is of a rectangle enclosed by lines drawn from specified vertexes P1 and P2 in parallel with the main scanning direction X and the subscanning direction Y. When the operator specifies the position of the two vertexes P1 and P2 in the block copy image displayed on the color monitor 53 with the mouse 63, image data representing an image in the subject region PR is read out of the first image memory 31 and stored in the second image memory 32. Image data for the original block copy image remains intact in the first image memory 31. FIG. 8 is an enlarged view of the subject region PR.

Further at step S6, the operator designates a display color number Nd of a linework element to be processed (the circle C in FIG. 7) as a linework display color number LNd. The display color number Nd indicates a color of an image displayed on the color monitor 53 and is given separately from the system color number Ns. Black and white are display colors in the block copy image. For example, a numeral representing black (for example, a numeral 'one') is given as the linework display color number LNd for specifying the display color of the circle C. The display color is designated, for example, by selecting one color from a color list of various colors displayed on the color monitor 53 with the mouse 63.

Although the operator designates the linework display color number LNd in the above procedure, a value representing black may previously be set to each linework element.

At step S7, the operator selects automatic or manual processing for detecting and reconnecting a line break. When the automatic processing is selected, the program proceeds to step S8.

At step S8, the break CP1 in the subject region PR is automatically detected and reconnected by the arithmetic and control unit 61.

Figure 9:
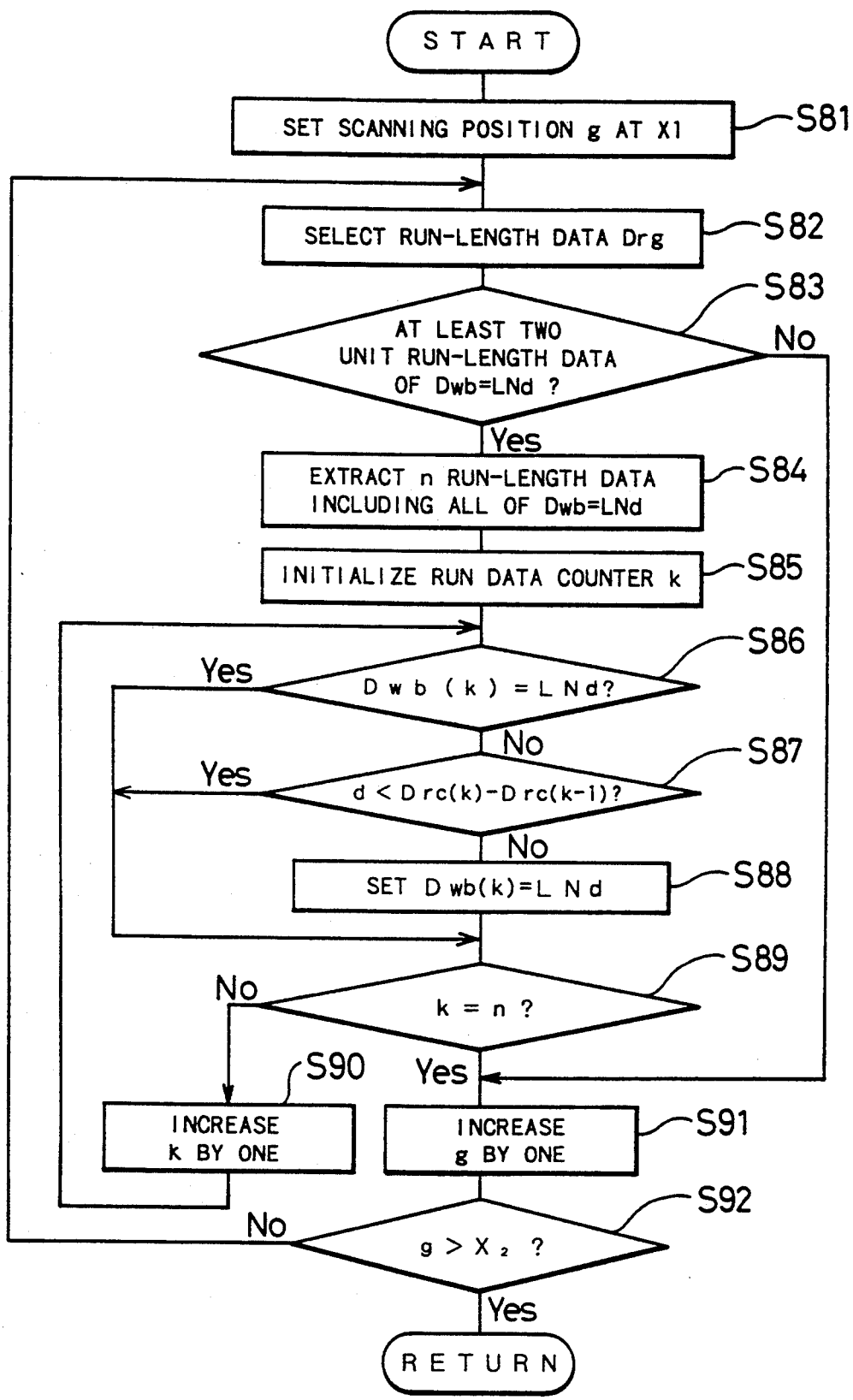
FIG. 9 is a flowchart showing details of automatic processing for reconnecting a break.

FIG. 9 is a flowchart showing the details of processing at step S8. Parameters used in steps of FIG. 9 are defined as follows:

Scanning position g: a parameter showing a position in the subscanning direction of a current scanning line, an image of which is under processing; and Run data counter k: a counter showing an ordinal number of unit run-length data on the current scanning line.

At step S81, a minimum subscanning coordinate X1 in the subject region PR is set as the scanning position g.

At the following step S82, run-length data Drg for the scanning position g in the subject region PR is read out of the second image memory 32 and stored in the auxiliary memory 62.

At step S83, it is judged whether at least two unit run-length data of the run-length data Drg have the black/white designation data Dwb equal to the linework display color number LNd. The value 'one' indicating black is allocated to the linework display color number LNd at step S6. When at least two unit run-length data have the data Dwb equal to the number LNd, there is a possibility that unit run-length data representing a line break in white exists between the two unit run-length data.

When there are less than two unit run-length data having Dwb equal to LNd, unit run-length data representing a line break does not exist at the position g. The program thus skips steps S84 through S90 and proceeds to step S91.

On the other hand, when there are at least two unit run-length data having Dwb equal to LNd, unit run-length data representing a line break may exist at the position g. The program thus proceeds to the following step S84.

FIG. 10 is a conceptual view illustrating the run-length data Drg at the subscanning position Xg and a linear image part represented by the run-length data Drg. There exist three unit run-length data of Dwb=LNd=1 in FIG. 10, the program proceeds to step S84.

At step S84, n pieces of consecutive unit run-length data are extracted from the run-length data Drg at the coordinate g so that all the unit run-length data of Dwb=LNd are included. In the embodiment of FIG. 10, five consecutive unit run-length data Drg(2) through Drg(6) are extracted. That is, the number n is equal to five in the embodiment.

At step S85, the run data counter k is initialized. The minimum of the counter values 2 through 6 defining the unit run-length data Drg(2) through Drg(6) extracted at step S84, that is, the value two, is set as the run data counter k.

At steps S86 through S88, it is judged whether the unit run-length data Drg(k) indicates a line break, and reconnection processing of the line break is executed when existence of a break is recognized.

At step S86, it is judged whether the black/white designation data Dwb(k) of the unit run-length data Drg(k) specified by the run data counter k is equal to the linework display color number LNd. When Dwb is equal to Lnd, which represents black, the unit run-length data Drg(k) does not indicate a line break and the program proceeds to step S89 described later.

On the other hand, when Dwb is not equal to Lnd, which represents white, the program proceeds to step S87 at which the run length of the unit run-length data Drg(k) is compared with a predetermined maximum width d of a line break. Since the coordinate data Drc(k) of the unit run-length data Drg(k) denotes the starting point of the unit run-length in the main scanning direction as seen in FIGS. 4 and 5, the run length is obtained by the subtraction [Drc(k)−Drc(k−1)]. The maximum line break width d is a threshold value previously determined by an operator. For example, when the resolution of the image is 2,000 dots per inch, the value d is set equal to five pixels as shown in FIG. 10.

When the run length is less than or equal to the maximum line break width d, the unit run-length data Drg(k) represents a line break. The program then proceeds to step S88, at which the white/black designation data Dwb of the unit run-length data Drg(k) is set equal to the value (=1) of the linework display color number LNd. In the case of FIG. 10, the run length of the unit run-length data Drg(5), that is, [Drc(5)−Drc(4)], is equal to 4. Since the value 4 is smaller than the maximum line break width d=5, the value of the white/black designation data Dwb(5) is changed to one. Namely, the line break is changed from white to black in color and connected to the black portions across the line break.

When the run length is larger than the maximum line break width d, the unit run length data Drg(k) does not represent a line break, and the program skips step S88 and proceeds to step S89.

At step S89, the value of the run data counter k is compared with the number n.

When the run data counter k is not equal to n, the program proceeds to step S90 at which the parameter k is increased by one and returns to step S86 for processing the next unit run-length data.

On the other hand, when the parameter k is equal to n, all necessary processing for the unit run-length data Drg(1) through Drg(n) at the scanning position of g is completed, and the program proceeds to step S91.

At step S91, the value of the scanning position g is increased by one.

When the value of the scanning position g is less than or equal to the maximum value X2 in the subscanning direction of the subject region PR, the program returns to step S82, and processing of the run-length data at the current scanning position is executed.

When the value of the scanning position g is greater than the maximum value X2, automatic line break reconnection processes are completed.

The break CP1 of the circle C is detected and reconnected according to steps S81 through S92. The processing is automatically executed by the arithmetic and control unit 61 and does not require operator's decisions. Namely, a line break is detected and reconnected efficiently and quickly. All the operator has to do is to set the subject region PR, the linework display color number LNd, and the maximum line break width d in advance.

When processing of step S8 of FIG. 2 is completed, the program returns to step S4 at which region segmentation is executed on the whole block copy image and, the skipped image filled with the system colors is displayed on the color monitor 53. The program then proceeds to step S5 at which existence of a line break is detected again. Steps S4 and S5 are repeated because the automatic processing of step S8 can not fill a break CP2 (shown in FIG. 11) which runs in parallel with the main scanning direction Y.

When a line break is found on the skipped image after the automatic reconnection processing of step S8, the program proceeds to step S6 at which another subject region PR and another linework display color number LNd are specified, and to step S7, at which manual reconnection processing of a line break is selected.

Figure 11:
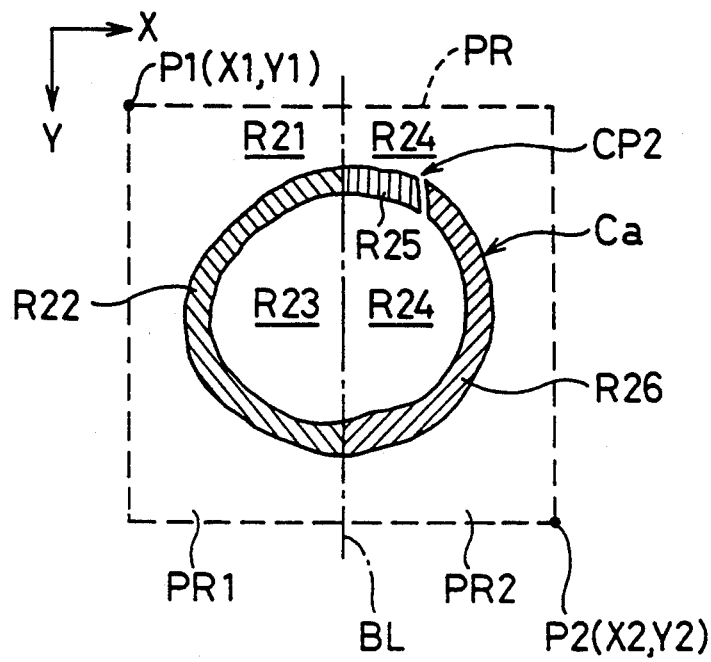
FIGS. 11 and 12 illustrate a subject region including a break parallel to a main scanning direction.

Steps S9 through S14 show processes for reconnecting a line break according to instructions of an operator. Processing for reconnecting the break CP2 of a circle Ca shown in FIG. 11 is described below in detail.

At step S9, the subject region PR is divided into two equal portions in the subscanning direction X. The subject region PR are divided into two separate subject portions PR1 and PR2 by a boundary line BL parallel to the main scanning direction Y. Suppose the coordinates of vertexes P1 and P2 of the subject region PR are respectively (X1, Y1) and (X2, Y2), the boundary line BL is expressed by the equation:

$$X=(X1+X2)/2$$

The subject region PR is divided so that the accurate position of a line break can be detected. Provided that the subject region PR is not divided into two, when the circle Ca of FIG. 11 has only one break (for example, CP2), the whole circle Ca is shown as one independent region and filled with one system color. It is thus difficult to find the break CP2 on the color monitor 53. On the contrary, when the subject region PR is divided into two, the circle Ca is also divided into two by the boundary line BL. Even when the circle Ca has only one break, the linework elements intercepted by the break are distinguished from each other as separate regions and displayed in different colors.

At step S10, the same processing as step S4 is executed for the two separate portions PR1 and PR2. Separate areas R21 through R26 divided at step S10 are also shown in FIG. 11. System color numbers Ns, for example, 21 through 26 are allocated to the separate areas R21 through R26, respectively.

When the circle does not have a break, each linework element of the circle Ca in each of the separate subject portion PR1 and PR2 is designated as one region and only one system color number Ns is allocated thereto. When the circle Ca has the break CP2 as shown in FIG. 11, the linework element of the circle Ca in the right target portion PR2 is divided into two areas R25 and R26 to which different system color numbers Ns are allocated.

The system color numbers Ns allocated to the separate areas R21 through R26 are written in the system color data Dsc in the run-length data Dri (see FIG. 5), which is stored in the second image memory 32.

Here a system color table SCT (FIG. 13) is prepared which shows the relation between the system color numbers Ns and the display color numbers Nd. In the system color table SCT, the display number Nd=1 representing a black portion is registered for the separate areas R22, R25, and R26 corresponding to the linework elements. The display number Nd=0 representing a white portion is registered for the separate areas R21, R23, and R24 corresponding to the white background of the layout sheet.

The program then proceeds to step S11 at which the density of the image in the subject region PR is lowered. Namely, a reduced image obtained by decreasing the total number of pixels of the image is displayed on the monitor. In this embodiment, some pixels are skipped; for example, a 2×2 pixel block is compressed and reduced to one pixel. The display color number Nd and the system color number Ns of a pixel at a predetermined position (for example, a pixel of the upper left) in the 2×2 pixel block are used as the numbers Nd and Ns of the compressed pixel.

The reduced image data or reduced run-length data representing the skipped image of the subject region PR is supplied from the arithmetic and control unit 61 to the second image memory 32 and stored therein.

The reduced image data is also supplied to the color monitor device 5 and the reduced image is displayed on the color monitor 53. Here the color palette 52 allocates to the separate areas R21 through R26 respective colors corresponding to the system color numbers Ns, and the reduced image in various colors is displayed on the color monitor 53.

At step S12, the operator examines the image on the color monitor 53 with naked eyes so as to detect a part, as the break CP2, including a linework element in a different color other than at the boundary line BL. The linework elements of the circle Ca have a single color in the subject portions PR1 and PR2 when the circle does not have a break. Accordingly, a part in a different color represents the break CP2 of the circle Ca.

Although a line break is generally difficult to be found in a reduced image, it is readily detected as a different colored part in the embodiment.

The program then proceeds to step S13, at which the operator specifies a region SR (FIG. 12) including the break CP2 on the color monitor 53 by pointing to two vertexes Q1 and Q2 of the region SR with the mouse 63. The specified region SR is enlarged and displayed on the color monitor 53 as shown in FIG. 14. The separate areas R25 and R26 representing linework elements of the circle Ca may be colored corresponding to the display color number Nd (for example, in black).

At step S14, the operator reconnects the break CP2 on the enlarged region SR. The operator specifies two points PP1 and PP2 in the two areas R25 and R26 divided by the break CP2 with the mouse 63, and inputs an instruction to connect the two points PP1 and PP2 by a segment SG. The connection processing is performed by allocating an identical display color number Nd or system color number Ns to the pixels between the two points PP1 and PP2.

The segment SG for connecting the two points PP1 and PP2 has a width of at least one pixel and may have a smaller width than the circle Ca. This is because the segment SG of at least one pixel wide efficiently prevents the inside and outside of the circle Ca from being filled with different colors in tint laying operation.

When a break exists in the vicinity of the boundary line BL, the position of the break is not easily determined on the color monitor 53 at step S12. Existence of a break on the circle Ca is, however, recognized at step S5. The operator specifies a region including an intersection of the circle Ca and the boundary line BL, finds a break with naked eyes on the enlarged region, and reconnects the break in the same manner as above.

On instruction of reconnecting the line break, the coordinates of the two points PP1 and PP2 based on the origin O of the block copy BC (see FIG. 3) are calculated by the arithmetic and control unit 61. The arithmetic and control unit 61 then corrects the original image data or run-length data stored in the first image memory 31 to produce new image data representing a block copy image including the two points PP1 and PP2 connected by the segment SG. The corrected image data is stored in the first image memory 31.

The corrected image data is further processed in various ways such as tint laying by the arithmetic and control unit 61. The processed image data stored in the first image memory 31 is supplied through the run-length restoration unit 4 to the image recording device 7 to be recorded on a recording medium such as a photosensitive film or a printing plate according to the operator's instructions.

C. Procedure of Region Segmentation

Figure 15:
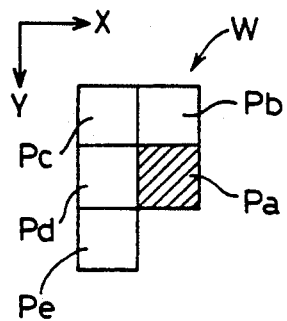
FIG. 15 illustrates a window used for region segmentation.

The region segmentation is performed in the following manner, for example. FIG. 15 is a view showing a window W used in the region segmentation process. The shaded pixel Pa is a pixel-to-be-processed, and peripheral pixels Pb through Pe are in contact with the pixel Pa.

The window W is successively moved in the main scanning direction Y in such an order that a scanning line at smaller subscanning coordinate X is scanned earlier. When only the pixel Pa is black and none of the other pixels Pb through Pe is black, a new system color number Ns is allocated to the pixel Pa. On the other hand, when the pixel Pa and any one of the peripheral pixels Pb through Pe are black, the system color number Ns allocated to the black peripheral pixel is given to the pixel Pa as its system color number Ns.

The pixel Pa in white is processed in a similar manner. That is, a new system color number Ns is allocated to the pixel Pa when all of the peripheral pixels are black, and the same system color number Ns is allocated to the pixel Pa as that of a white peripheral pixel when any one of the peripheral pixels is white. But when the target pixel Pa and the pixels Pc and Pe each obliquely in contact with Pa are white, and the other pixels Pb and Pd are black, a different system color number Ns is allocated to the pixel Pa from that of the pixels Pc and Pe. This makes these white pixels only obliquely contacting each other to be separate regions. As a result, a black separate region and a white separate region which obliquely intersect each other are prevented.

While the window W is moved, different system color numbers Ns are successively allocated to independent regions. In such processing, there are some cases that two or more system color numbers Ns are allocated to one region. FIGS. 16 through 19 are explanatory views showing processes in such a case.

Figure 16:
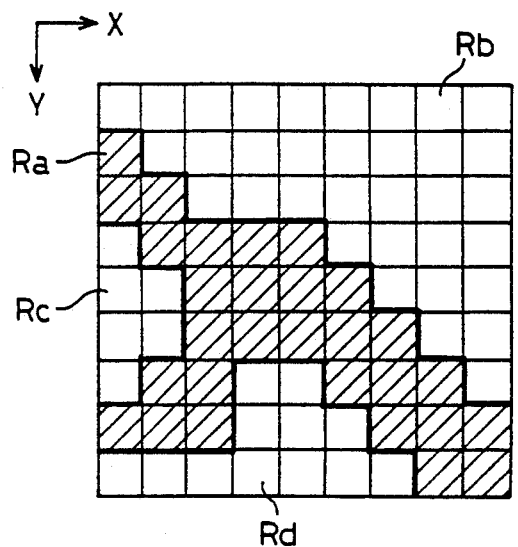

Suppose, as shown in FIG. 16, a block copy image includes a black region Ra and three independent white regions Rb, Rc, and Rd separated by the region Ra.

While the window W is successively moved in the main scanning direction Y in such an order that a scanning line at smaller subscanning coordinate X is scanned earlier, different system color numbers Ns are allocated to the respective regions Ra through Rd.

Figure 17:
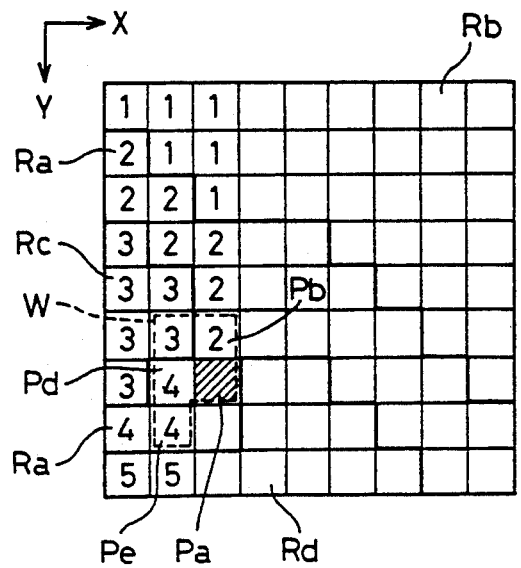
Figures 18, 19, 20:
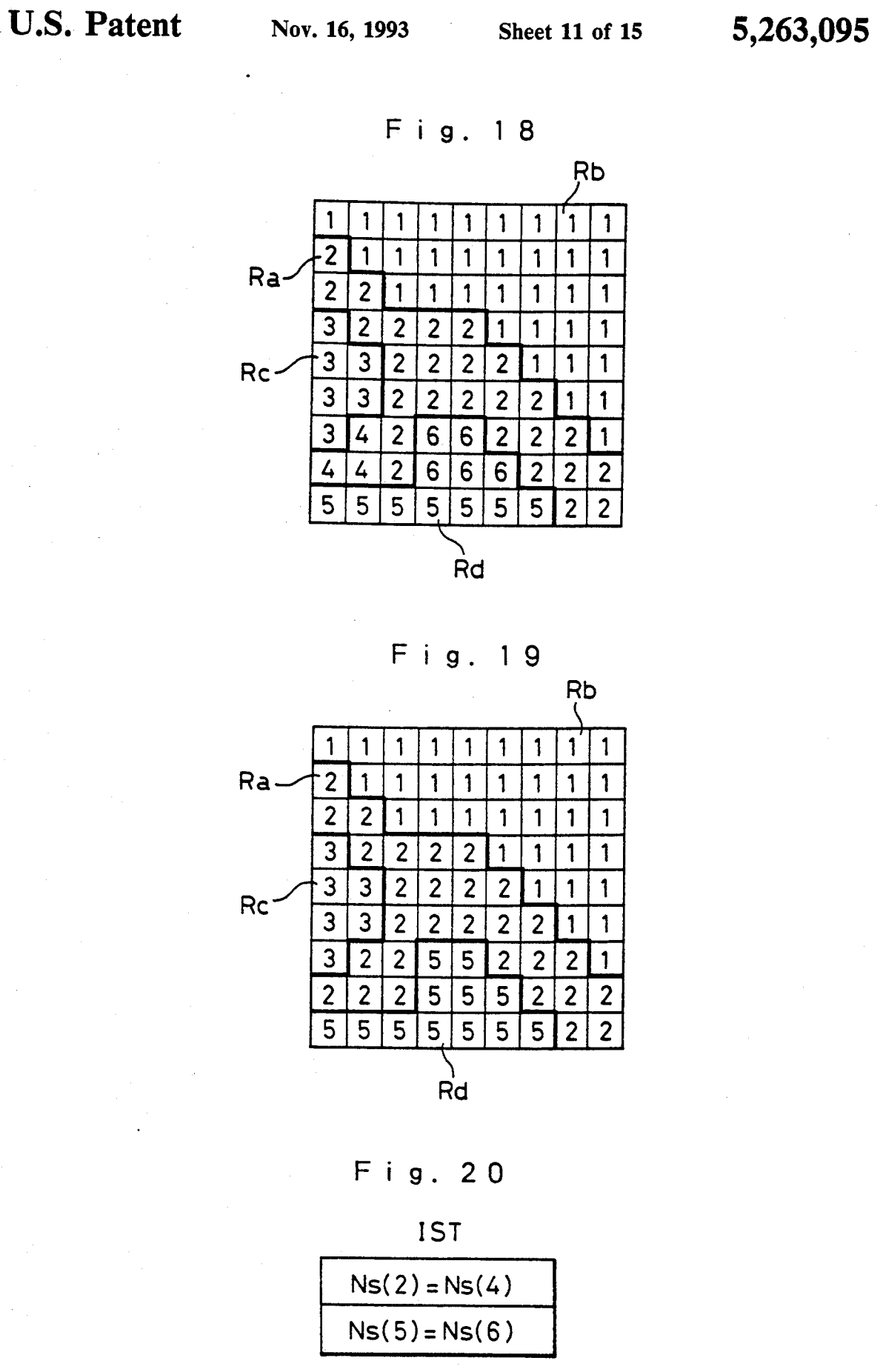

Numerals on pixels denote the system color numbers Ns allocated to the pixels in FIG. 17. Pixels without numerals do not have the system color numbers Ns yet. As seen in FIG. 17, the black region Ra includes pixels to which a numeral 2 is allocated as the system color number Ns and those with a numeral 4. When the window is on the position shown in FIG. 17, the system color number Ns on the pixel Pb in contact with the target pixel Pa is equal to 2, and those on the peripheral pixels Pd and Pe are equal to 4. Information representing that Ns=2 and Ns=4 denote the same system color is temporarily stored in the auxiliary memory 62, and the smaller system color number Ns=2 is allocated to the target pixel Pa. FIG. 18 shows a system color image or an image filled with respective system colors, and FIG. 20 shows an identical system color table IST, both obtained as a result of such processing for all the pixels of FIG. 16.

The table IST indicates that the system color numbers Ns=2 and Ns=4 denote an identical system color; that is, they are allocated to the same image region. The table IST also indicates that the numbers Ns=5 and Ns=6 also denote an identical system color. The table IST is stored in the auxiliary memory 62.

The arithmetic and control unit 61 then reallocates a common system color number (for example, the smallest system color number) to pixels with different system color numbers in the same image region for the image of FIG. 18 based on the table IST. The result of such processing is shown as an image of FIG. 19, in which each of the regions Ra through Rd has one system color number Ns which is different from those of the other regions.

Although processing of pixel image data is described above, run-length image data of FIG. 5 may be processed in a similar manner.

In processing of run-length image data, run-length data of two scanning lines adjacent to each other are read. The left peripheral pixels Pc, Pd, and Pe on the window W of FIG. 15 exist on the first scanning line closer to the origin of the coordinates, and the peripheral pixel Pb and the target pixel Pa are on the second scanning line.

The run-length data for the two scanning lines are simultaneously examined. When the boundary of separate regions or separate run-lengths is located between the pixels Pc and Pd or Pd and Pe, the color of the target pixel Pa is compared with those of the peripheral pixels Pb through Pe in the same manner as above. A system color number Ns is accordingly allocated to the target pixel Pa. When the boundary of separate regions is located between the peripheral pixel Pb and the target pixel Pa on the second scanning line, a system color number Ns is allocated to the target pixel Pa in a similar manner.

Region segmentation is thus executed by allocating system color numbers Ns to the pixels in the image on the basis of run-length data while the run-length data on the two adjacent scanning lines are compared with each other.

The processing above divides the subject region PR into several separate areas and allocates a common system color number Ns to the pixels in each separate area. The system color numbers Ns are registered as system color data Dsc in each unit run-length data.

D. Modifications

In the above embodiment, a whole block copy image is divided into separate regions and a line break is detected prior to designation of the subject region PR at steps S4 and S5. Alternatively, processing after step S6 may be executed, without step S4, for each region one at a time which includes a closed loop or a linework element defining a closed area.

The processing at steps S4 and S5, however, detects and reconnects a line break only for required linework elements with a break. Namely, the method of the above embodiment processes the whole block copy image more efficiently.

Although the subject region PR is divided into two parts at step S9 for improving efficiency, it may be divided into more than two parts.

The subject region PR or the enlarged region SR is not limited to a rectangle but may be in any predetermined shape such as a circle. Alternatively, an operator may freely determine the shape of these regions with a mouse.

Although steps S9 through S14 of FIG. 2 may be skipped, these steps reconnect line breaks parallel with the main scanning direction.

The line breaks can be reconnected according to steps S9 through S14 without the automatic reconnection at step S14.

Figure 12:
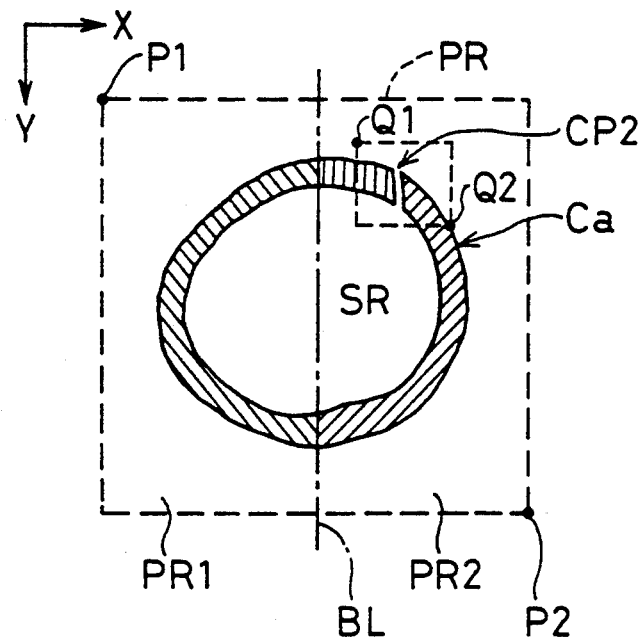
Figures 13, 14:
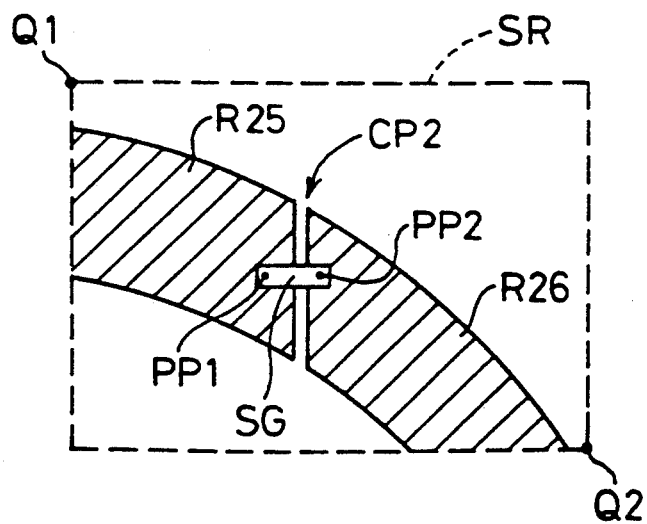
FIG. 13 illustrates a system color table including system color numbers and corresponding display color numbers.
FIG. 14 is an enlarged view showing a region having a break parallel to the main scanning direction.

At steps S9 through S14, it is difficult to find a line break located in the vicinity of the boundary line BL on the color monitor 53 since intersections of the boundary line BL and the circle C are displayed in different colors as seen in FIGS. 11 and 12 even when there are no line breaks. Some methods for dealing with this problem are given below:

A first method is to execute steps S6, and S9 through S14 for the target region PR and then to execute the same steps for another target region which includes the same closed loop. The second target region is so determined as to have different coordinates and dimensions from the first target region. At the second processing, the boundary line BL is located at a different position from that of the first processing, and the portion of the circle C at the vicinity of the boundary line BL at the first processing is examined at the second processing.

A second method is to execute steps S6, and S9 through S14 without changing the target region PR but by shifting the boundary line BL in the secondary scanning direction X. The second method has an advantage of not requiring the change of the target region PR.

Figure 21:
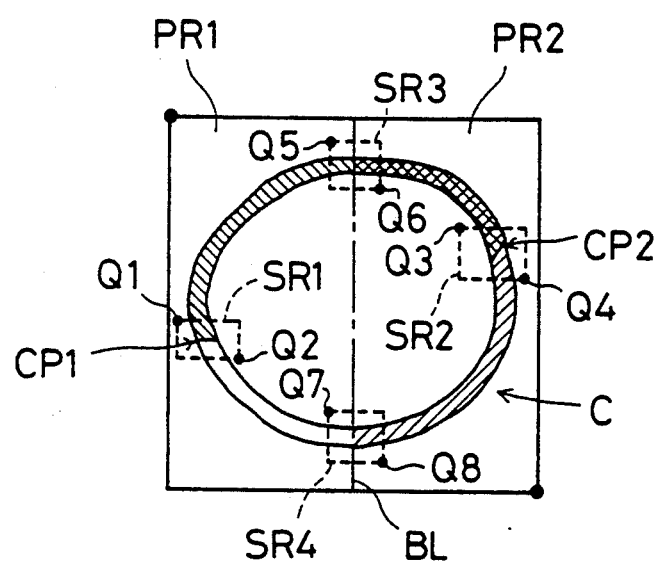
FIG. 21 illustrates another example of part of a subject region.

A third method, shown in FIG. 21, is to execute steps S13 and S14 by specifying regions SR3 and SR4 including intersections of the boundary line BL and the circle C. The processing of S14 is executed only when a break is detected on enlarged images of these regions SR3 and SR4. In the third method, the two regions SR3 and SR4 including intersections of the boundary line BL and the circle, and other two regions SR1 and SR2 including line breaks are respectively enlarged. A line break is then detected and reconnected for each region SR1, SR2, SR3, or SR4. Namely, all breaks on the circle C are thus detected and reconnected.

The density of the image may be lowered according to the following special reducing process instead of the data skipping process described above.

In the data skipping process, one pixel at a predetermined position in each pixel block is selected, and the color of the selected pixel constitutes the skipped image.

In the special reducing process, priority of colors is previously determined and the color of the highest priority among pixels in each pixel block is selected.

Figure 22:
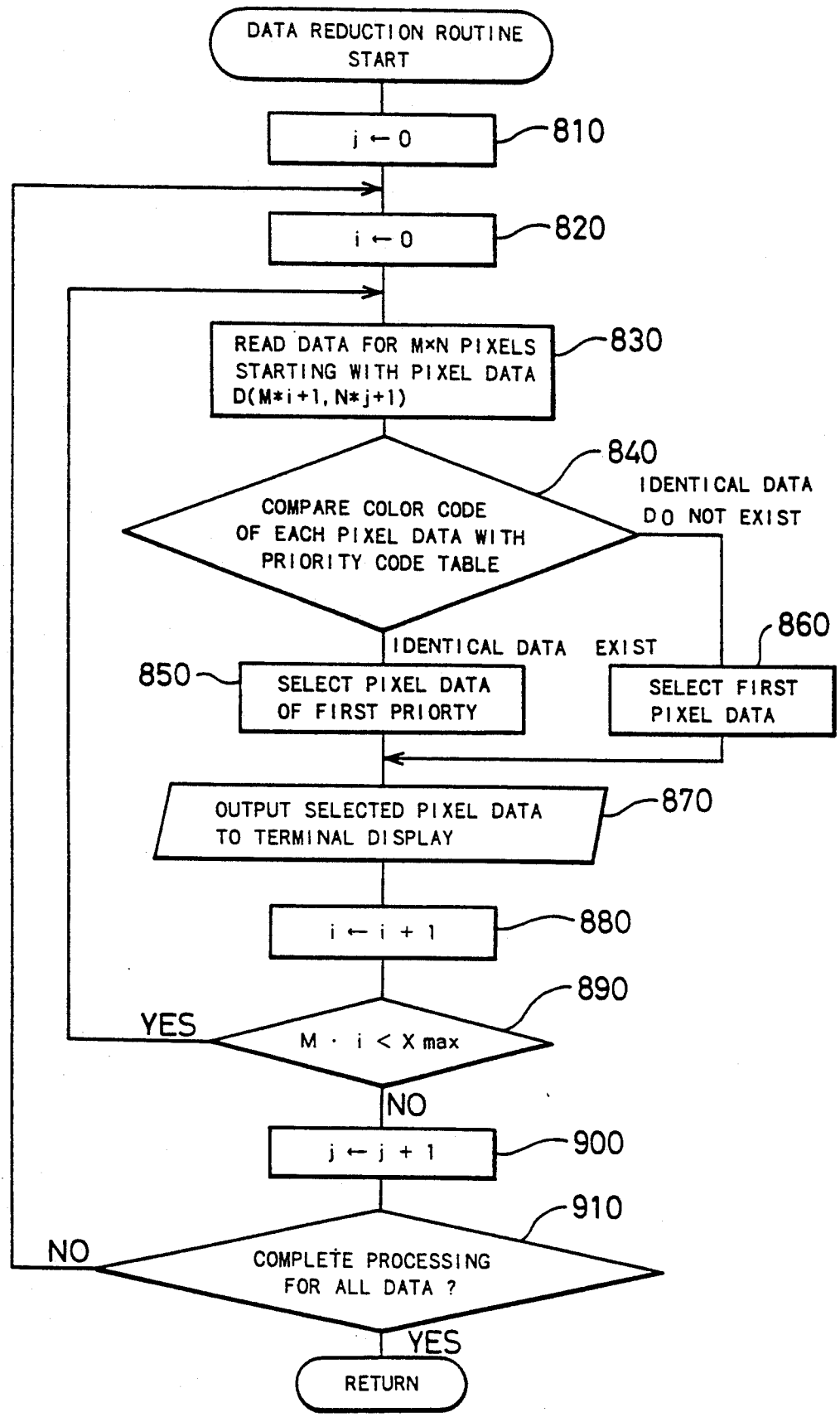
FIG. 22 is a flowchart showing the procedure of an image reducing process.

FIG. 22 is a flowchart showing the details of the special reducing process. In such process, each M×N pixel block where M and N are integers is generally reduced to one pixel. In this embodiment, both M and N are equal to two.

When the program starts, variables j and i are cleared to zero at steps 810 and 820.

Image data for M×N pixels starting from image data $D(M*i+1, N*j+1)$ at coordinates $(M*i+1, N*j+1)$ are read at step 830, where the symbol * denotes multiplication. Since M and N are equal to 2, pixel data $D(1,1)$, $D(2,1)$, $D(1,2)$ and $D(2,2)$ are read in the initial conditions (i=0 and j=0). Pixel data for every four pixels, for example, $D(3,1)$, $D(4,1)$, $D(3,2)$, and $D(4,2)$, are successively read at step 830 in the course of processing.

Figure 23:
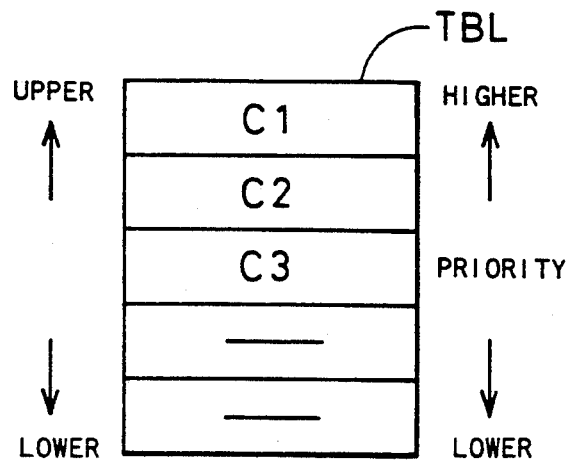
FIG. 23 illustrates a priority code table.

At step 840, the color code or display color number of the pixel data D read at step 830 is compared with a priority code table TBL stored in the auxiliary memory 62. The priority of display colors is registered in the priority code table TBL as shown in FIG. 23. In the embodiment, the color corresponding to the display color number Nd(=5) of the subject region PR specified at step S6 of FIG. 2, which is black, has the highest priority.

In black and white images, when priority of either of black or white is given in the priority code table TBL, priority of the other color may not be registered in the priority code table TBL.

When at least one color code of the four pixel data D in the pixel block is found in the priority code table TBL, the program proceeds to step 850 at which the color code of the highest priority is selected out of color codes of the four pixel data. On the other hand, when none of the color codes is found in the priority code table TBL at step 840, the program proceeds to step 860, at which the pixel data D(M*i+1, N*j+1) at the left upper position in the pixel block is selected out of the pixel data D read at step 830.

Figure 24:
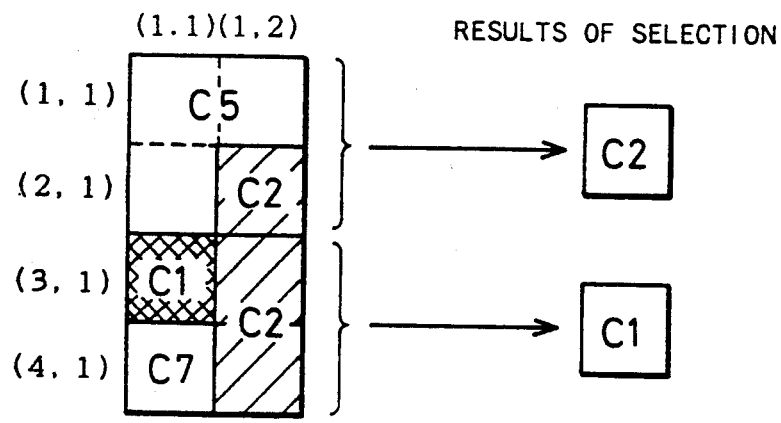
FIG. 24 illustrates an example of a target image for the special reducing process.

In an example of FIG. 24, pixel data D(2,2) representing the color C2 is selected among pixel data D(1,1), D(2,1), D(1,2), and D(2,2), and pixel data D(3,1) representing the color C1 is among pixel data D(3,1), D(4,1), D(3,2), and D(4,2).

The selected pixel data D is output as representative pixel data to the color monitor 53.

At step 880, the variable i is increased by one, and at step 890 the product of the variable i and a reduction ratio M in the main scanning direction is compared with a maximum value Xmax in the main scanning direction. If the answer is Yes, the program returns to step 830 and steps 830 through 890 are repeated.

By repeating processing of steps 830 through 890, pixel data of the highest priority is selected for each M×N pixel block, and output to the color monitor 53.

If the answer is No at step 890, the program proceeds to step 900 at which the variable j is increased by one. At step 910, it is judged whether processing is completed for the whole image data. If the answer is No, the program returns to step 820, and steps 820 through 910 are repeated. By such repeated processing, pixel data of the highest priority is output to the color monitor 53 for each M×N pixel block. If the answer is Yes at step 910, the program exists from the routine.

In the special image reduction process, one color is selected for each pixel block according to the priority code table TBL, and a reduced image is filled with the selected color. The reduced image generated by the process clearly and accurately reproduces the original image without any line break.

When the original image includes a fine line, the line may be broken on a reduced image generated by the ordinary data skipping process. On the contrary, the special reducing process does not break a fine line on a reduced image but makes the line relatively thick. Accordingly, linework elements in a different color are readily detected.

Figure 25A:
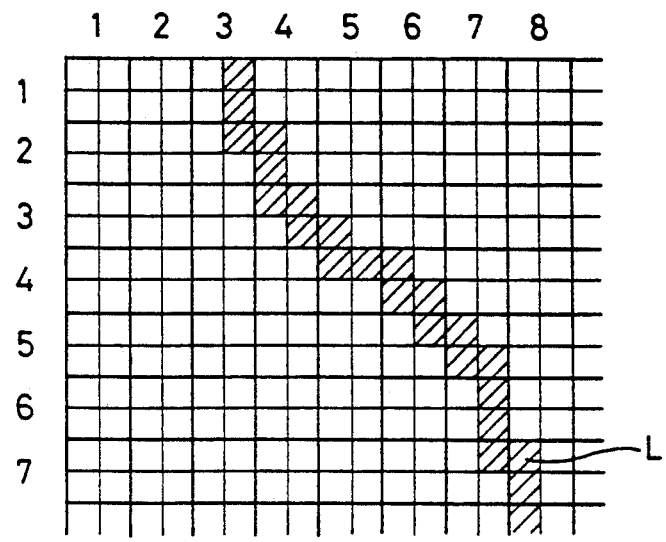
FIG. 25A illustrates an example of an image including a fine line.
Figure 25C:
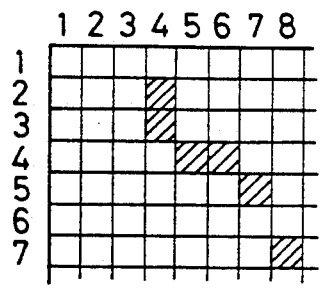
FIGS. 25B and 25C are views showing an image obtained by image reducing processes.
Figure 25B:
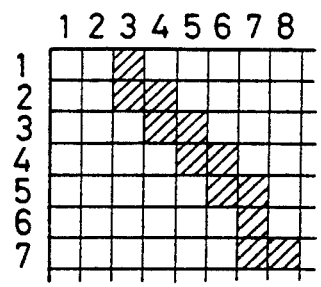

FIG. 25A is a view showing an image including a fine line L, and FIG. 25B shows a reduced image obtained by processing the image of FIG. 25A according to the special reducing process. As seen in FIGS. 25A and 25B, in the special reducing process, the 2×2 pixel block where at least one pixel is part of the line L is reduced to a pixel having the color of the line L on the reduced image. Even when the line L is very thin, for example, when the line L is one pixel across, an unfavorable break in a linework due to the reducing process does not occur on the reduced image.

FIG. 25C is a view illustrating a reduced image obtained by ordinary data skipping process. The reduced image is composed of pixels at upper left positions of 2×2 pixel blocks of FIG. 25A. A break in a linework due to the data skipping process sometimes occurs as seen in FIG. 25C.

When the special reducing process is applied to the present invention, only breaks existing on the original image are displayed on the color monitor 53 and thereby line breaks are more accurately detected.

As clearly seen by comparison between FIG. 25B and FIG. 25C, the special reduction process makes lines relatively thick on the reduced image. Accordingly, linework elements in a different color are easily detected on the reduced image, and this makes it easy to find line breaks.

According to the present invention, separate image parts are filled with different colors, and thus linework elements having a break are shown in different colors. Line breaks are therefore readily found only by detecting linework elements painted in different colors.

Alternatively, a line break is detected by finding an image part which has a color different from a linework element and a width less than or equal to a prescribed threshold value, and the color of the image part is changed into that of the linework element to reconnect the line break. Detection and reconnection of line breaks are therefore readily executed without operator's judgement.

By filling separate regions in the whole linework image with different colors, the linework element having a break is easily detected as a closed area having the same color inside and outside thereof. Accordingly, only the region including a linework element with a break are readily specified as an image region-to-be-processed. Namely, detection and reconnection of line breaks is efficiently executed.

By producing a reduced image according to a predetermined priority of colors, a fine linework is displayed relatively thick on the reduced image. Accordingly, the difference in color of the linework elements, that is, line breaks, are readily detected.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of processing a linework image with the aid of an image processing system, comprising the steps of:

(a) preparing image data representing said linework image;

(b) examining said image data to find an image part which has a color different from that of a linework element and a width less than a predetermined threshold value; and (c) defining said image part as a break;

said step (b) comprising the steps of (b-1) examining part of said image data for each scanning line on said linework image; and (b-2) finding said width along the scanning line;

and further comprising the step of:

(d) changing the color of said image part to the color of said linework element to thereby reconnect said break;

said image data comprising run length data.

2. A method of processing a linework image in accordance with claim 1, further comprising the step of:

(e) displaying said linework image on a display means, and specifying a subject region to be processed in said linework image displayed on the display means prior to said step (b); and wherein said step (b) comprises examining said image data within said subject region.

3. A method of processing a linework image in accordance with claim 2, wherein said step (e) further comprises the steps of:
   (e-1) dividing said linework image into plural separate regions, and allocating different colors to said separate regions;
   (e-2) displaying said linework image filled with said respective different colors on a display means;
   (e-3) comparing a first color at the inside of a linework element supposed to constitute a closed loop with a second color at the outside thereof on said linework image displayed on the display means; and
   (e-4) specifying said subject region so that said subject region includes a linework element whose first and second colors are identical.

4. A method of processing a linework image with the aid of an image processing system, comprising the steps of:
   (a) preparing image data representing said linework image;
   (b) dividing said linework image into plural divisional image areas by at least one boundary;
   (c) further dividing each of said plural divisional image areas into separate regions, and allocating different colors to said separate regions;
   (d) displaying said linework image filled with said respective different colors on a display means;
   (e) finding a part of a linework element of said linework image, said part having a different color from a neighboring part of said linework element;
   (f) displaying said part on the display means; and
   (g) detecting a break of said linework element within said part displayed on the display means.

5. A method of processing a linework image in accordance with claim 4, wherein
   said step (f) comprises displaying said part larger than said part in said linework image displayed at said step (d).

6. A method of processing a linework image in accordance with claim 5, further comprising the step of:
   (h) changing the color of said break to the color of said linework element thereby to reconnect said break.

7. A method of processing a linework image in accordance with claim 6, further comprising the step of:
   (i) displaying said linework image on a display means, and specifying a subject region to be processed in said linework image on the display means prior to said step (b); and wherein:
   said step (b) comprises dividing said subject region into said plural divisional areas.

8. A method of processing a linework image in accordance with claim 7, wherein said step (d) further comprises the steps of:
   (d-1) dividing said subject region into pixel blocks of a prescribed shape, each pixel block including plural pixels;
   (d-2) establishing priority of colors of pixels;
   (d-3) extracting a representative pixel from each pixel block according to said priority;
   (d-4) generating a reduced image formed of said representative pixel; and
   (d-5) displaying said reduced image on said display means.

9. A method of processing a linework image in accordance with claim 8, wherein said step (g) further comprises the steps of:
   (g-1) dividing said linework image into plural separate regions, and allocating different colors to said separate regions;
   (g-2) displaying said linework image filled with said respective different colors on a display means;
   (g-3) comparing a first color at the inside of a linework element supposed to constitute a closed loop with a second color at the outside thereof on said linework image displayed on the display means; and
   (g-4) specifying said subject region so that said subject region includes a linework element whose first and second colors are identical.

10. An apparatus for processing a linework image, comprising:
    first means for obtaining image data representing said linework image;
    second means for examining said image data to find an image part which has a color different from that of a linework element and a width less than a predetermined threshold value, thereby defining said image part as a break;
    said second means comprising:
    examining means for examining part of said image data for each scanning line on said linework image; and
    finding means for finding said width along the scanning line; said apparatus further comprising
    connection means for changing the color of said image part to the color of said linework element to thereby reconnect said break; and
    data conversion means for converting said image data obtained by said first means into run length data;
    said second means comprising means for processing on the basis of said run-length data.

11. An apparatus for processing a linework image in accordance with claim 10, further comprising:
    display means for displaying said linework image; and
    input means for generating signals specifying a subject region to be processed by said second means in said linework image displayed on said display means.

12. An apparatus for processing a linework image, comprising:
    means for obtaining image data representing said linework image;
    first dividing means for dividing said linework image into plural divisional image areas by at least one boundary;
    second dividing means for further dividing each of said plural divisional image areas into separate regions, and allocating different colors to said separate regions;
    display means for displaying an image;
    first data supply means for supplying image data representing said linework image filled with said respective different colors to said display means, thereby to display said linework image in said respective different colors;
    input means for generating signals specifying a part of a linework element of said linework image, said part having a different color from a neighboring part of said linework element;

second data supply means for supplying image data representing said part to the display means, thereby to display said part; and pointing to means for pointing a break of said linework element within said part displayed on said display means.

13. An apparatus for processing a linework image in accordance with claim 12, wherein:

said second data supply means displays said part larger than said part in said linework image displayed by said first data supply means.

14. An apparatus for processing a linework image in accordance with claim 13, further comprising:

means for changing the color of said break to the color of said linework element thereby to reconnect said break.

15. An apparatus for processing a linework image in accordance with claim 14, further comprising:

second input means for generating signals specifying a subject region to be processed by said second means in said linework image displayed on said display means; and wherein:

said first dividing means divides said subject region into said plural divisional areas.

16. An apparatus for processing a linework image in accordance with claim 15, further comprising:

means for dividing said subject region into pixel blocks of a prescribed shape, each pixel block including plural pixels; means for establishing priority of colors of pixels; means for extracting a representative pixel from each pixel block according to said priority; means for generating a reduced image formed of said representative pixel; and means for supplying image data representing said reduced image to said display means thereby to display said reduced image.

17. A method of processing a linework image with the aid of an image processing system, comprising the steps of:

dividing said linework image into plural divisional image areas by at least one boundary;

providing each of said plural divisional image areas into separate regions, and allocating different colors to said separate regions, any break in said linework image forming a border between regions;

displaying said linework image filled with said respective different colors on a color display means;

finding a part of a linework element of said linework image not divided by said boundary, said part having different colors in neighboring portions of said linework element; and determining that a break exists in said linework element where said part has two adjacent portions of different colors.

18. A method of processing a linework image in accordance with claim 17, wherein said step of determining comprises:

displaying said part on the display means; and detecting a break of said linework element within said part displayed on the display means.

19. A method of processing a linework image in accordance with claim 18 wherein:

said step of displaying said part comprises displaying said part larger than said part in said linework image is displayed in said first step of displaying.

20. A method of processing a linework image in accordance with claim 19, further comprising the step of:

changing the color of said break to the color of said linework element thereby to reconnect said break.

21. A method of processing a linework image in accordance with claim 20, further comprising the step of:

displaying said linework image on a display means, and specifying a subject region to be processed in said linework image on the display means prior to said first step of dividing; and wherein:

said first step of dividing comprises dividing said subject region into said plural divisional areas.

22. A method of processing a linework image in accordance with claim 21, wherein said first step of displaying further comprises the steps of:

dividing said subject region into pixel blocks of a prescribed shape, each pixel block including plural pixels;

establishing priority of colors of pixels;

extracting a representative pixel from each pixel block according to said priority;

generating a reduced image formed of said representative pixel; and displaying said reduced image on said display means.

23. A method of processing a linework image in accordance with claim 22, wherein said step of detecting further comprises the steps of:

dividing said linework image into plural separate regions, and allocating different colors to said separate regions;

displaying said linework image filled with said respective different colors on a display means;

comparing a first color at the inside of a linework element supposed to constitute a closed loop with a second color at the outside thereof on said linework image displayed on the display means; and specifying said subject region so that said subject region includes a linework element whose first and second colors are identical.

24. A method for determining that a break exists within a linework image supposed to a closed loop, with the aid of an image processing system, the method comprising:

dividing the area in which the linework image is disposed into plural separate regions, regions inside the loop being inside regions and regions outside the loop being outside regions, and allocating different colors to said separate regions;

displaying the linework image such that the regions are filled with said respective different colors on a display means;

comparing a first color at an inside region with a second color at an outside region of said linework image displayed on the display means; and determining that a break exists if the colors on the inside and outside of said linework image are the same.

25. Apparatus for processing a linework image with the aid of an image processing system, comprising:

means for dividing said linework image into plural divisional image areas by at least one boundary;

means for providing each of said plural divisional image areas into separate regions, and for allocating different colors to said separate regions, any break in said linework image forming a border between regions;

color display means for displaying said linework image filled with said respective different colors;

means for finding a part of a linework element of said linework image not divided by said boundary, said part having different colors in neighboring portions of said linework element; and means for determining that a break exists in said linework element where said part has two adjacent portions of different colors.

26. Apparatus for processing a linework image in accordance with claim 25, wherein said means for displaying further comprises means for displaying said part, and further comprising means for detecting a break of said linework element within said part displayed on the means for displaying.

27. Apparatus for processing a linework image in accordance with claim 26 wherein:

said means for displaying said part comprises means for displaying said part larger than said part when said linework image is displayed.

28. Apparatus for processing a linework image in accordance with claim 27, further comprising:

means for changing the color of said break to the color of said linework element thereby to reconnect said break.

29. Apparatus for processing a linework image in accordance with claim 28, further comprising:

means for specifying a subject region to be processed in said linework image on the means for displaying prior to dividing with said means for dividing.

30. Apparatus for processing a linework image in accordance with claim 29, further comprising:

means for dividing said subject region into pixel blocks of a prescribed shape, each pixel block including plural pixels;

means for establishing priority of colors of pixels;

means for extracting a representative pixel from each pixel block according to said priority;

means for generating a reduced image formed of said representative pixel; and said means for displaying comprising means for displaying said reduced image.

31. Apparatus for processing a linework image in accordance with claim 30, wherein said means for detecting comprises:

means for dividing said linework image into plural separate regions, and for allocating different colors to said separate regions;

means for displaying said linework image filled with said respective different colors on said means for displaying;

means for comparing a first color at the inside of a linework element supposed to constitute a closed loop with a second color at the outside thereof on said linework image displayed on the means for displaying; and means for specifying said subject region so that said subject region includes a linework element whose first and second colors are identical.

32. Apparatus for determining that a break exists within a linework image supposed to be a closed loop, with the aid of an image processing system, the apparatus comprising:

means for dividing the area in which the linework image is disposed into plural separate regions, regions inside the loop being inside regions and regions outside the loop being outside regions, and for allocating different colors to said separate regions;

color display means for displaying colors of said linework image such that the regions are filled with said respective different colors;

means for comparing a first color at an inside region with a second color at an outside region of said linework image displayed on the display means; and means for determining that a break exists if the colors on the inside and outside of said linework image are the same.

* * * * *